United States Patent
Li et al.

(10) Patent No.: US 9,821,282 B2
(45) Date of Patent: Nov. 21, 2017

(54) DIESEL EXHAUST FLUID MIXING SYSTEM FOR A LINEAR ARRANGEMENT OF DIESEL OXIDATION CATALYST AND SELECTIVE CATALYTIC REDUCTION FILTER

(71) Applicant: GM Global Technology Operations LLC, Detroit, MI (US)

(72) Inventors: Jianwen Li, Farmington Hills, MI (US); Chijou Wang, Farmington Hills, MI (US); Rahul Mital, Rochester Hills, MI (US); Luciano Nunziato Di Perna, Troy, MI (US); James B. Rodgers, Clarkston, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 165 days.

(21) Appl. No.: 14/560,466

(22) Filed: Dec. 4, 2014

(65) Prior Publication Data
US 2016/0158714 A1     Jun. 9, 2016

(51) Int. Cl.
*F01N 3/10* (2006.01)
*B01F 5/06* (2006.01)
(Continued)

(52) U.S. Cl.
CPC ........ *B01F 5/0602* (2013.01); *B01F 3/04007* (2013.01); *B01F 3/04049* (2013.01); *B01F 5/0268* (2013.01); *B01F 5/0473* (2013.01); *B01F 5/0647* (2013.01); *F01N 3/103* (2013.01); *F01N 3/206* (2013.01); *F01N 3/2066* (2013.01);
(Continued)

(58) Field of Classification Search
CPC .... B01F 5/0647; B01F 3/4049; B01F 5/0614; B04C 1/00; B04C 2003/003
See application file for complete search history.

(56) References Cited

U.S. PATENT DOCUMENTS 8,707,687 B2    4/2014   Aneja et al.
8,826,649 B2    9/2014   Li et al.
(Continued)

FOREIGN PATENT DOCUMENTS

CN    101528331 A     9/2009
DE    10247987 A1    4/2004
(Continued)

OTHER PUBLICATIONS

Chinese Office Action dated Aug. 24, 2017 corresponding to CN201510538384.7.

*Primary Examiner* — Mark Laurenzi
*Assistant Examiner* — Jason Sheppard
(74) *Attorney, Agent, or Firm* — Harness, Dickey & Pierce, P.L.C.

(57) ABSTRACT

An exhaust system for a diesel engine, includes an exhaust passage adapted to be attached to the diesel engine. A diesel oxidation catalyst is provided in the exhaust passage along with a selective catalyst reduction device disposed downstream from the diesel oxidation catalyst. A diesel exhaust fluid mixing system includes a diesel exhaust fluid injection nozzle and a mixing device defining a single inlet opening and a single outlet opening connected to one another by a partial spiral flow passage. The diesel exhaust fluid injection nozzle injects diesel exhaust fluid directly into the inlet opening of the partial spiral flow passage.

11 Claims, 4 Drawing Sheets

(51) Int. Cl.
   *F01N 13/00*   (2010.01)
   *B01F 3/04*    (2006.01)
   *F01N 3/20*    (2006.01)
   *F01N 3/28*    (2006.01)
   *B01F 5/02*    (2006.01)
   *B01F 5/04*    (2006.01)

(52) U.S. Cl.
   CPC ......... *F01N 3/2892* (2013.01); *F01N 13/009* (2014.06); *F01N 13/0097* (2014.06); *F01N 2240/20* (2013.01); *F01N 2610/02* (2013.01); *F01N 2610/1453* (2013.01); *Y02T 10/24* (2013.01)

(56) References Cited

U.S. PATENT DOCUMENTS

| | | | |
|---|---|---|---|
| 2007/0245718 A1 | 10/2007 | Cheng et al. | |
| 2011/0214415 A1 | 9/2011 | Thomas | |
| 2012/0023914 A1* | 2/2012 | Omote | B01D 53/9477 60/295 |
| 2013/0216442 A1* | 8/2013 | Brunel | B01F 3/04049 422/172 |
| 2016/0138454 A1* | 5/2016 | Alano | F01N 3/208 422/168 |

FOREIGN PATENT DOCUMENTS

| | | |
|---|---|---|
| DE | 102008032110 A1 | 1/2009 |
| DE | 102011077156 A1 | 12/2012 |
| DE | 112011103501 T5 | 11/2013 |

* cited by examiner

DIESEL EXHAUST FLUID MIXING SYSTEM FOR A LINEAR ARRANGEMENT OF DIESEL OXIDATION CATALYST AND SELECTIVE CATALYTIC REDUCTION FILTER

FIELD

The present disclosure relates to exhaust treatment for diesel engines and more particularly to a diesel exhaust fluid mixing system for reducing $NO_x$ emissions from a diesel engine.

BACKGROUND

This section provides background information related to the present disclosure which is not necessarily prior art.

Diesel engines can be run with a lean burn air-to-fuel ratio (overstoichiometric ratio), to ensure the full combustion of soot and to prevent the exhaust of unburnt fuel. The excess of oxygen necessarily leads to generation of nitrogen oxides ($NO_x$), which are harmful pollutants, from the nitrogen in the air. Selective catalytic reduction is used to reduce the amount of $NO_x$ released into the atmosphere. Diesel exhaust fluid (from a separate DEF tank) is injected into the exhaust pipeline, the aqueous urea vaporizes and decomposes to form ammonia and carbon dioxide. Within the SCR catalyst, the $NO_x$ are catalytically reduced by the ammonia ($NH_3$) into water ($H_2O$) and nitrogen ($N_2$), which are both harmless; and these are then released through the exhaust. Diesel Exhaust Fluid (DEF) is an emissions control liquid required by modern diesel engines. It is injected into the exhaust stream. DEF is never added to diesel fuel. It is a non-hazardous solution of 32.5% urea in 67.5% de-ionized water. DEF is clear and colorless, and looks exactly like water. It has a slight smell of ammonia, similar to some home cleaning agents. DEF is used in by Selective Catalytic Reduction (SCR) technology to remove harmful NOx emissions from diesel engines.

Recently, the U.S. Environmental Protection Agency (EPA) brought in new emissions standards requiring medium- and heavy-duty vehicles to significantly reduce engine emissions, particularly NOx and particulate matter (PM). Vehicle manufacturers use SCR to meet these standards. DEF is sprayed into the exhaust, breaking down NOx gases into nitrogen and water using an advanced catalyst system. As a result most new diesel trucks, pickups, SUVs, and vans are now fitted with SCR technology and have a DEF tank that must be regularly refilled.

The diesel exhaust fluid is mixed with the exhaust gasses upstream of the SCR. One problem with current mixer designs is that they are prone to have urea deposit build-up that can inhibit proper exhaust flow therethrough and therefore require maintenance. Accordingly, it is desirable to provide a diesel exhaust fluid mixing device that reduces urea deposits and improves urea mixing.

SUMMARY

This section provides a general summary of the disclosure, and is not a comprehensive disclosure of its full scope or all of its features.

An exhaust system is provided for a diesel engine, including an exhaust passage adapted to be attached to the diesel engine. A diesel oxidation catalyst is provided in the exhaust passage along with a selective catalyst reduction device disposed downstream from the diesel oxidation catalyst. A diesel exhaust fluid mixing system includes a diesel exhaust fluid injection nozzle and a mixing device defining a single inlet opening and a single outlet opening connected to one another by a partial spiral flow passage. The diesel exhaust fluid injection nozzle injects diesel exhaust fluid directly into the inlet opening of the partial spiral flow passage.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
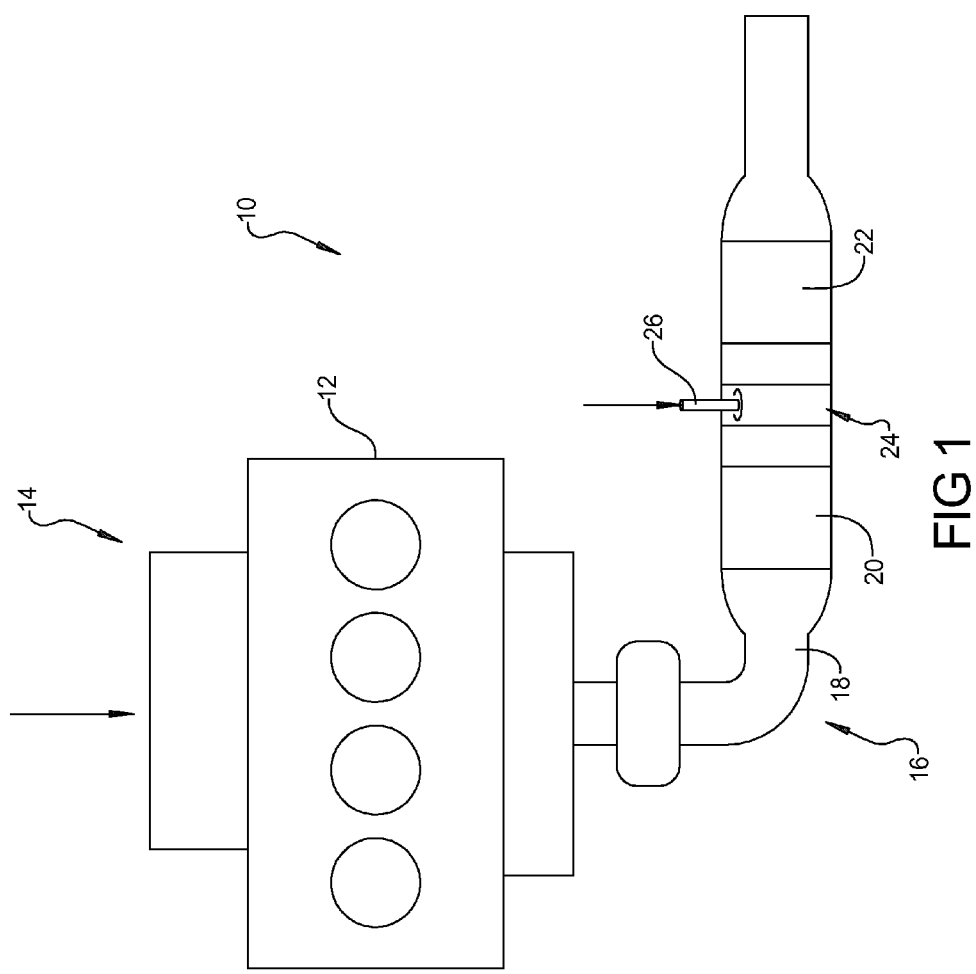
FIG. 1 is a schematic view of a vehicle engine incorporating a diesel exhaust fluid mixing system according to the principles of the present disclosure.
Figure 2:
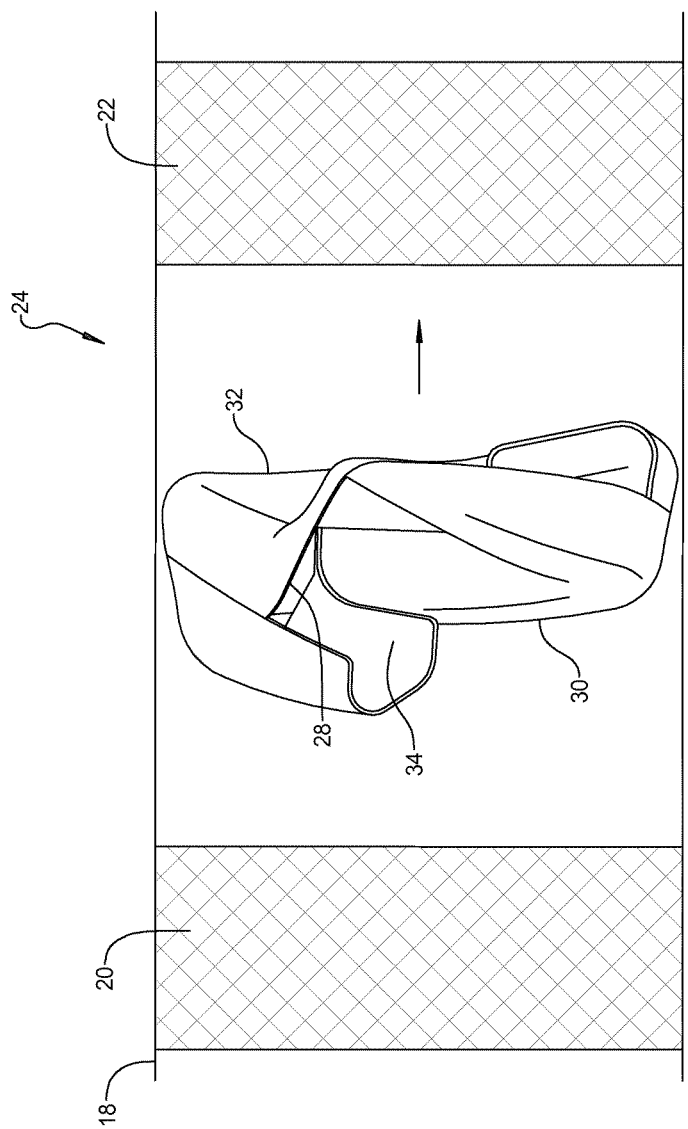
FIG. 2 is a schematic view of a diesel exhaust fluid mixer between a diesel oxidation catalyst and a selective catalytic reduction filter according to the principles of the present disclosure.
Figure 3:
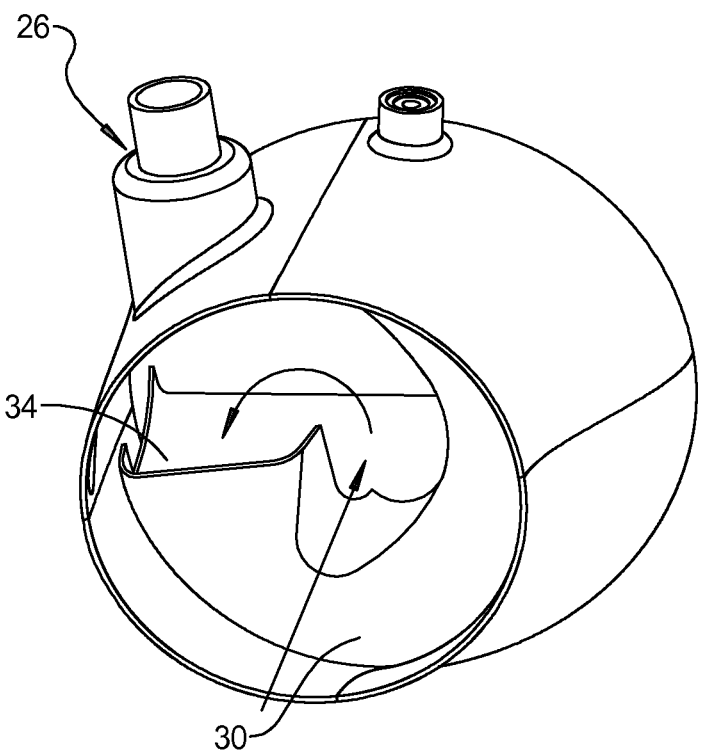
FIG. 3 is a front perspective view of the diesel exhaust fluid mixer shown in FIG. 2.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIG. 1, a portion of a vehicle 10 is shown having an engine 12 with an air and fuel intake system 14 and an exhaust system 16. The exhaust system 16 can include a turbocharger 17 and an exhaust passage 18 including a diesel oxidation catalyst (DOC) 20 and a selective catalyst reduction device 22 which are packaged very close to one another in a very small amount of space. The selective catalyst reduction device 22 can include a selective catalytic reducer (SCR) or a selective catalytic reduction filter (SCRF). A diesel exhaust fluid mixing system 24 is tightly packaged in a very small space in the exhaust passage downstream of the DOC 20 and upstream of the selective catalyst reduction device 22 for mixing diesel exhaust fluid with the exhaust gasses within exhaust passage 18 as explained herein. The diesel oxidation catalyst 20 is shown linearly aligned with the selective catalyst reduction device 22, although other arrangements such as L-shape and angular orientations can also be used.

Figure 6:
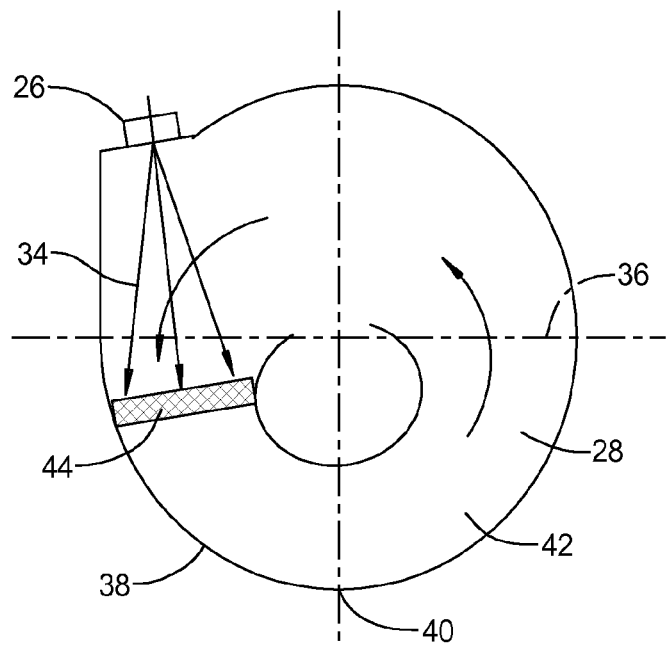
FIG. 6 is a sectional view of the partial spiral passage through the diesel exhaust fluid mixer shown in FIG. 2.

The diesel exhaust fluid mixing system 24 is shown in greater detail in FIGS. 2-6. The diesel exhaust fluid mixing system 24 (best shown in FIGS. 3, 4 and 6) includes a diesel exhaust fluid injection nozzle 26 and a partial spiral flow passage 28 that can be defined by a pair of opposing shells 30, 32. The pair of opposing shells include an upstream shell 30 and a downstream shell 32. The upstream shell 30 defines an inlet opening 34 and the downstream shell 32 defines an outlet opening 36. The partial spiral flow passage 28 can traverse a partial spiral angle of between 90 and 360 degrees and more preferably between 120 and 270 degrees. With reference to FIG. 6, the partial spiral flow passage 28 can include a contraction region 38 with a decreasing cross section downstream of the inlet opening 34, a transition region 40 downstream of the contraction region 38 and an expansion region 42 with an increasing cross section that is downstream of the transition region 40.

Figure 4:
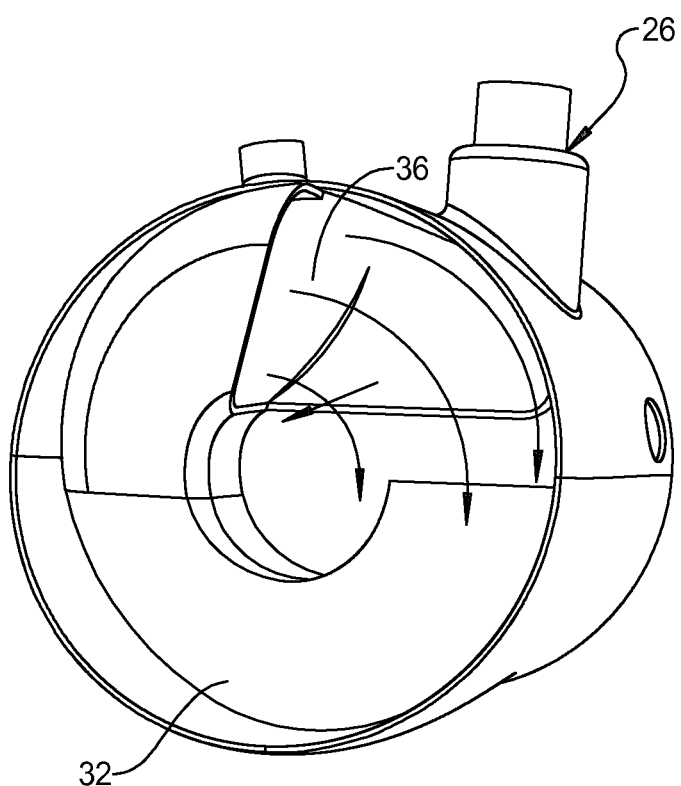
FIG. 4 is a rear perspective view of the diesel exhaust fluid mixer shown in FIG. 2.
Figure 5:
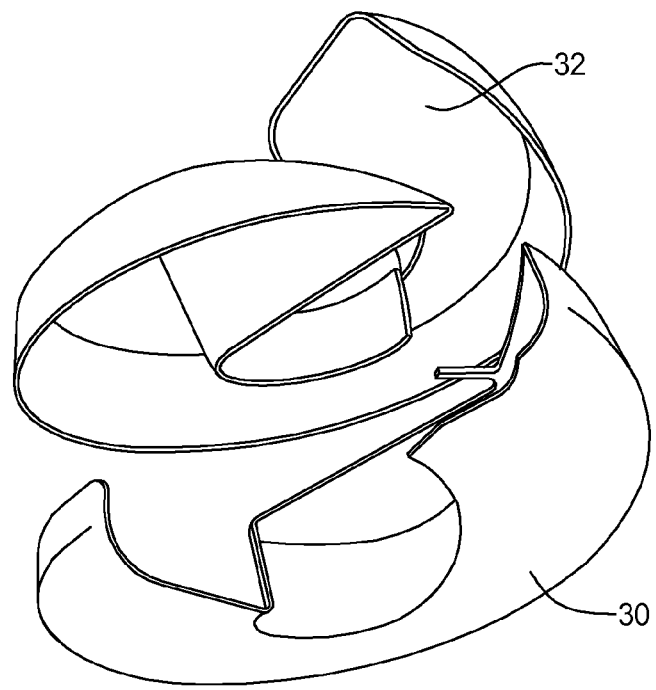
FIG. 5 is an exploded perspective view of the diesel exhaust fluid mixer shown in FIG. 2.

The outlet opening 36 of the partial spiral flow passage 28 opens with a wide cross section in a direction generally perpendicular to an axis of flow of the exhaust passage 18. The diesel exhaust fluid injection nozzle 26 injects diesel exhaust fluid directly into the inlet opening 34 of the partial spiral flow passage 28. An impingement plate 44 can be disposed within the partial spiral flow passage 28 downstream of the inlet opening 34 so that the diesel exhaust fluid impinges directly upon the impingement plate 44. The impingement plate 44 can include apertures and tines as well as other mixing enhancement features. The impingement plate 44 creates fluid droplets and exhaust gas turbulence to provide a thorough mixing of the diesel exhaust fluid and the exhaust gasses in a high velocity flow region of the partial spiral flow passage 28. The high velocity flow in the contraction region 38 causes the diesel exhaust fluid to vaporize so that no diesel exhaust fluid deposits remain on the impingement plate 44. The outlet opening 36 of the diesel exhaust fluid mixing system 24 is located off center relative to a center axis of the exhaust passage 18, as shown in FIG. 4, so that the exiting exhaust gasses leaving the partial spiral flow passage 28 generate a swirl around a face of the opening of the SCR device 22.

The diesel exhaust fluid spray is targeted at a high flow velocity area to reduce the wall wetting and increase vaporization rate and mixing rate. A compact axial length of the spiral mixing system effectively utilizes the space available for mixing and flow distribution. The spiral flow and contraction and expansion regions of the flow passage 28 create swirls and turbulences for mixing enhancement. The improved mixing eliminates DEF deposits, reduces DEF consumption, improves NOx conversion and improves catalyst volume utilization.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An exhaust system for a diesel engine, comprising:
an exhaust passage adapted to be attached to a diesel engine;
a diesel oxidation catalyst in said exhaust passage;
a selective catalyst reduction device disposed downstream from said diesel oxidation catalyst;
a diesel exhaust fluid mixing system including a diesel exhaust fluid injection nozzle and a mixing device defining a single inlet and a single outlet opening connected to one another by a partial spiral flow passage, wherein said diesel exhaust fluid injection nozzle injects diesel exhaust fluid directly into said inlet opening; and
wherein said partial spiral flow passage includes an outer wall surface and an inner wall surface, wherein the partial spiral flow passage has a contraction region with a decreasing distance between the inner wall surface and the outer wall surface for providing a decreasing cross-section downstream of said inlet opening, a transition region downstream of said contraction region and an expansion region downstream of said transition region with an increasing distance between the inner wall surface and the outer wall surface for providing an increasing cross-section.

2. The exhaust system according to claim 1, wherein said partial spiral flow passage traverses between 90 and 180 degrees of a spiral.

3. The exhaust system according to claim 1, wherein said partial spiral flow passage traverses between 120 and 150 degrees of a spiral.

4. The exhaust system according to claim 1, wherein said partial spiral flow passage is defined by a pair of opposing shells received in said exhaust passage.

5. An exhaust system for a diesel engine, comprising:
an exhaust passage adapted to be attached to a diesel engine;
a diesel oxidation catalyst in said exhaust passage;
a selective catalyst reduction device disposed downstream from said diesel oxidation catalyst;
a diesel exhaust fluid mixing system including a diesel exhaust fluid injection nozzle and a mixing device defining a single inlet opening and a single outlet opening connected to one another by a partial spiral flow passage which includes an outer wall surface and an inner wall surface, wherein the partial spiral flow passage having a contraction region with a decreasing distance between the inner wall surface and the outer wall surface for providing a decreasing cross-section downstream of said single inlet opening, a transition region downstream of said contraction region and an expansion region downstream of said transition region with an increasing distance between the inner wall surface and the outer wall surface for providing an increasing cross-section, wherein said diesel exhaust fluid injection nozzle injects diesel exhaust fluid directly into said single inlet opening.

6. The exhaust system according to claim 5, wherein said selective catalyst reduction device is linearly aligned with said diesel oxidation catalyst.

7. The exhaust system according to claim 5, further comprising an impingement plate within said flow passage downstream from said inlet opening, wherein said diesel exhaust fluid injection nozzle sprays the diesel exhaust fluid directly at said impingement plate.

8. The exhaust system according to claim 5, wherein said flow passage is defined by a pair of opposing shells received in said exhaust passage.

9. The exhaust system according to claim 5, wherein said flow passage is partially spiral in shape.

10. The exhaust system according to claim 9, wherein said partial spiral flow passage traverses between 90 and 180 degrees of a spiral.

11. The exhaust system according to claim 9, wherein said partial spiral flow passage traverses between 120 and 150 degrees of a spiral.

* * * * *